(12) United States Patent
Tomatis

(10) Patent No.: US 6,363,838 B1
(45) Date of Patent: Apr. 2, 2002

(54) APPARATUS FOR THE MECHANIZED PREPARATION OF PIZZAS

(75) Inventor: Stefano Tomatis, Peveragno (IT)

(73) Assignee: C.M.T. Costruzioni Meccaniche E Technologia S.p.A., Peveragno (IT)

( * ) Notice: Subject to any disclaimer, the term of this patent is extended or adjusted under 35 U.S.C. 154(b) by 0 days.

(21) Appl. No.: 09/889,394

(22) PCT Filed: Jan. 6, 2000

(86) PCT No.: PCT/IB00/00023

§ 371 Date: Jul. 16, 2001

§ 102(e) Date: Jul. 16, 2001

(87) PCT Pub. No.: WO00/42857

PCT Pub. Date: Jul. 27, 2000

(30) Foreign Application Priority Data

Jan. 22, 1999 (IT) .......................................... TO99A0041

(51) Int. Cl.[7] .............................. A23L 1/00; A23L 3/04; A21C 3/02; A21C 9/00; A21C 11/06
(52) U.S. Cl. .............................. 99/353; 99/349; 99/427; 99/443 R; 99/450.1; 99/450.6; 99/450.7
(58) Field of Search ........................... 99/349, 352–355, 99/450.1, 450.6, 450.7, 423, 427, 348, 372–380, 443 C, 443 R; 100/303; 118/18, 25, 411; 141/183; 222/370, 288, 360, 380, 486, 585, 309, 334; 211/150 A, 150 HC, 96; 425/162, 168, 360, 429; 426/27, 279, 280, 496, 523

(56) References Cited

U.S. PATENT DOCUMENTS

| | | | |
|---|---|---|---|
| 2,190,483 A | 2/1940 | Pacilio | |
| 2,365,699 A | 12/1944 | Harriss et al. | |
| 3,358,618 A | 12/1967 | Vetta | |
| 3,735,692 A | 5/1973 | Marchignoni | |
| 3,949,660 A | 4/1976 | Kuhlman | |
| 4,116,119 A | 9/1978 | Kuhlman | |
| 4,771,726 A | 9/1988 | Fitch, Jr. | |
| 5,012,726 A | * 5/1991 | Fehr et al. | 99/450.6 |
| 5,117,749 A | * 6/1992 | Bakker | 99/450.1 |
| 5,121,677 A | * 6/1992 | LeClaire et al. | 99/357 |
| 5,417,989 A | 5/1995 | Atwood | |
| 5,630,358 A | 5/1997 | Patel | |

FOREIGN PATENT DOCUMENTS

| | | |
|---|---|---|
| GB | 385 035 | 1/1933 |
| WO | 90 13229 | 11/1990 |
| WO | 98 04137 | 2/1998 |
| WO | 99 08537 | 2/1999 |

* cited by examiner

Primary Examiner—Timothy F. Simone
(74) Attorney, Agent, or Firm—Guido Modiano; Albert Josif; Daniel O'Byrne

(57) ABSTRACT

The apparatus comprises a horizontal, extensible shovel which is driven step by step through a predetermined path by motorized means; a distributor of dough loaves arranged for dropping loaves at a first stop in the shovel path; a pizza moulder arranged at a second stop in the shovel path, for pressing and spreading the loaf; several distributors of a dressing, placed at at least a third stop in the shovel path, for dropping metered portions of dressing on the pizza carried by the shovel; and an oven placed at a fourth stop in the shovel path, for receiving the pizza from the shovel.

12 Claims, 6 Drawing Sheets

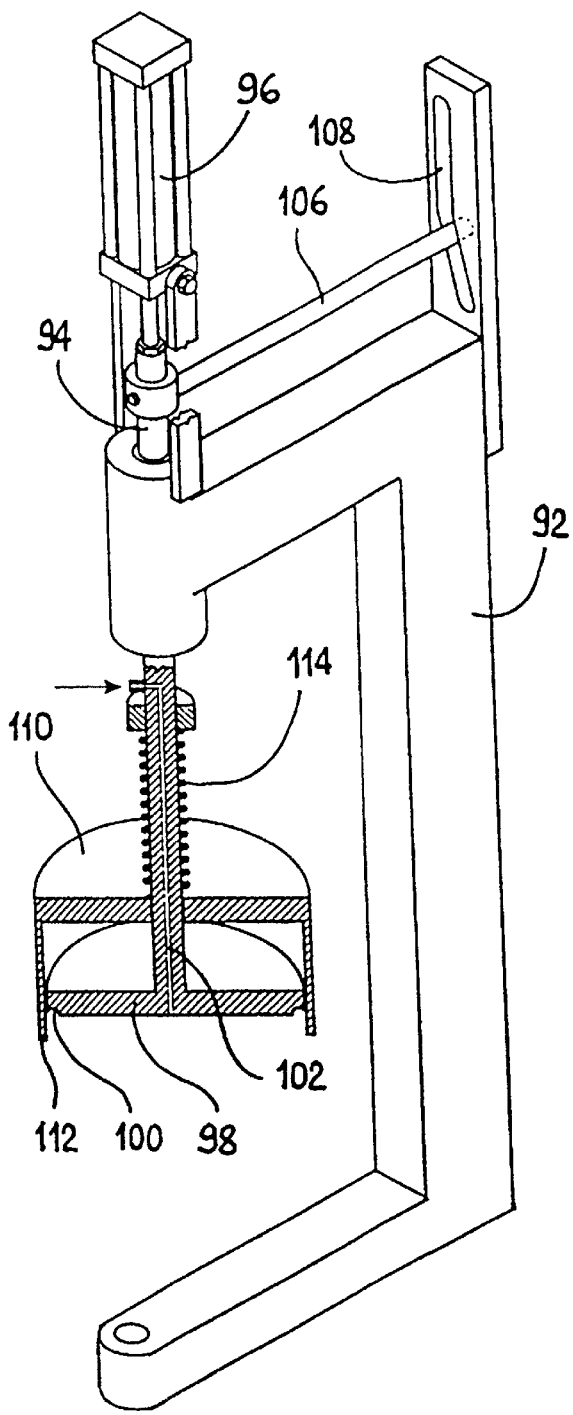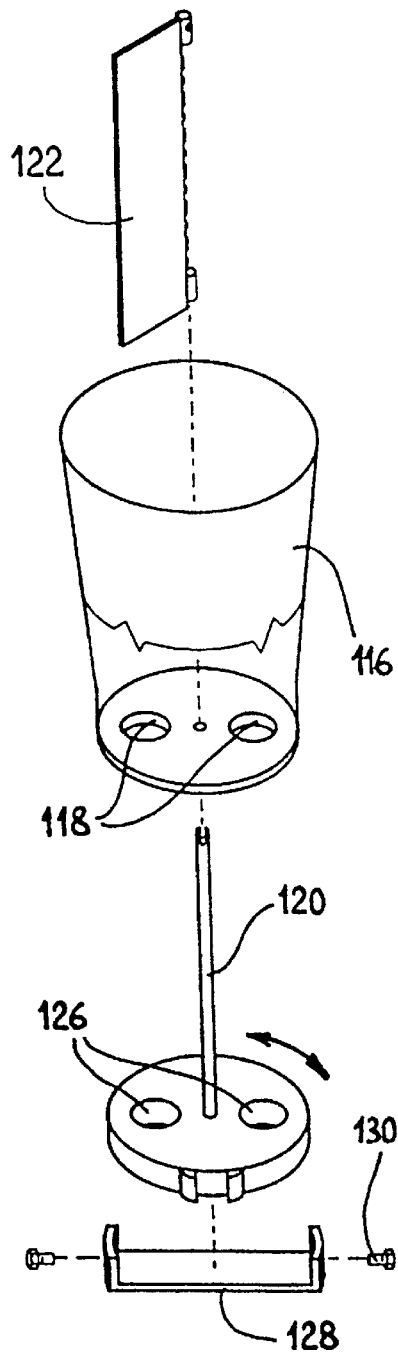
Fig. 5  Fig. 6

APPARATUS FOR THE MECHANIZED PREPARATION OF PIZZAS

BACKGROUND OF THE INVENTION

The invention is concerned with an apparatus for the mechanized and customized preparation of pizzas, particularly for use in self-service restaurants and pizzerias.

Today, pizzas are mostly prepared to order in pizzerias by a pizza-baker who generally, for each pizza, picks up a premixed and leavened portion of dough, spreads it out, and lays it on a baker's shovel. He then sprinkles the pizza with prepared dressings, such as hashed mozzarella, tomato, anchovies, minced ham and/or other dressings, and finally puts the pizza so prepared into the oven. It can be seen that the preparation of the pizza, though quick, is work-intensive, and compels the pizza-baker to a hard and continuous work over the full opening hours of the restaurant.

In order to reduce the requirements for specialized staff, U.S. Pat. No. 2,190,483 discloses a pizza-making machine where the pizzas are carried on a number of trays which are moved at fixed intervals along a circular path through loaf-flattening station, a seasoning station, a tunnel oven, and finally a pizza-unloading station. Beside being quite complex and costly to manufacture, the machine of U.S. Pat. No. 2,190,483 is also quite rigid in operation, because each of its trays proceeds through the operating cycle in equal steps. Moreover, the trays are led in queue through a tunnel oven while their associated pizzas are baked, adding to the operating rigidity of the machine, since the progression rate of the pizzas under preparation must conform to the dwelling time in the oven. Because of its large number of trays with underlying mechanisms, and because of the poorly accessible tunnel-shaped oven, the machine is also generally difficult to clean. In a similar approach, WO 98/04137 discloses a pizza-making machine having a carrousel structure, and which suffers from the same limitations of operating rigidity, mechanical complexity, high manufacturing cost, and difficult cleaning. The machine of WO 98/04137 includes, however, a distributor of dough loaves.

SUMMARY OF THE INVENTION

The main object of the invention is therefore to provide an apparatus for the mechanized preparation of pizzas, by which the pizzas can be prepared and baked on order, without appreciable human help, which is more flexible in operation with respect to known apparatuses, and which is of a simpler and less expensive construction.

Another important aim of the invention is to provide an apparatus for the mechanized preparation of pizzas, which can be cleaned more easily than known means, and which, in general, is more satisfactory from the sanitary viewpoint.

The invention achieves the above and other objects and advantages, such as will appear from the following disclosure, with an an apparatus for the mechanized and customized preparation of pizzas having the features recited in claim 1.

BRIEF DESCRIPTION OF THE DRAWINGS

The invention will be further described with reference to a few preferred embodiments which are disclosed in the following disclosure and are shown, by way of nonlimiting example, in the attached drawings, wherein:

FIG. 5 is a perspective view, partly broken away, on an enlarged scale, of a spreader device belonging to the apparatus of FIG. 1;

FIG. 6 is an exploded, perspective view of a dressing distributor belonging to the apparatus of FIG. 1;

DESCRIPTION OF THE PREFERRED EMBODIMENTS

Figure 1:
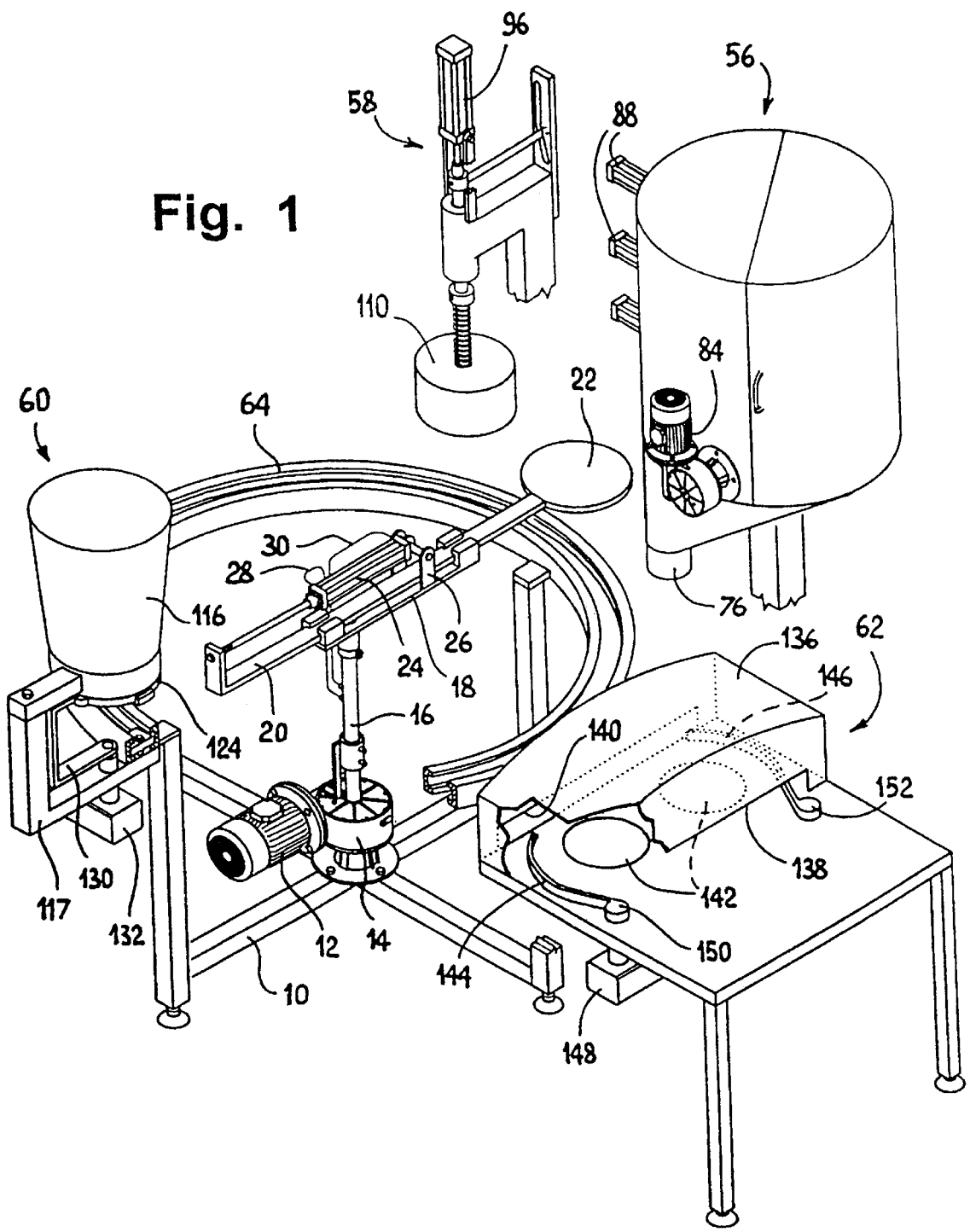
FIG. 1 is a perspective view of an apparatus for the preparation of pizzas according to the preferred embodiment of the invention.
Figure 2:
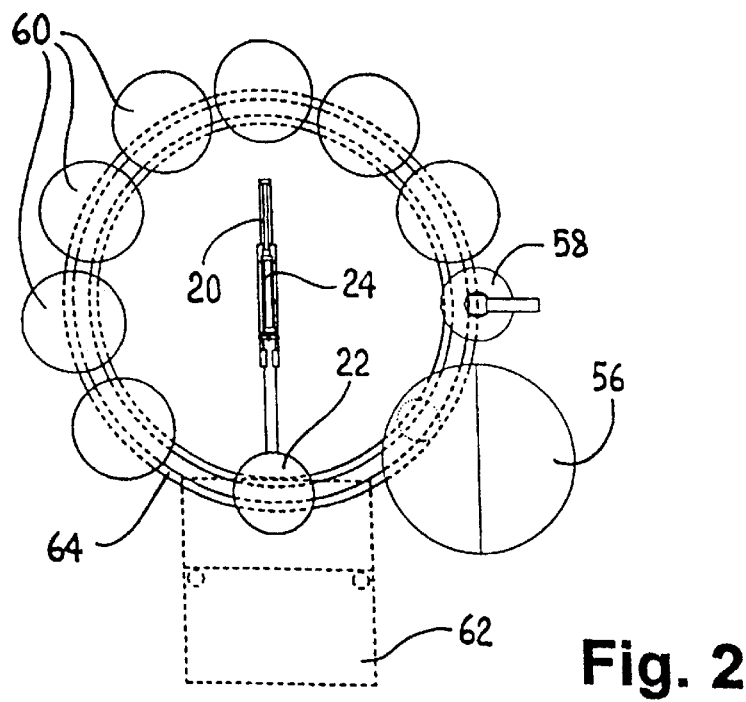
FIG. 2 is a diagrammatical plan view of the apparatus of FIG. 1.

With particular reference to FIGS. 1 and 2, a bedplate 10 supports a motor 12 with associated reduction gear 14, having a vertical output shaft 16. A bracket 18 is supported at the top of shaft 16 and carries a movable slide 20 having a horizontal shovel 22 at one end. A double-action air cylinder 24, connected between slide 20 and a lug 26 integral with bracket 18, is adapted to drive slide 20 in both directions. Cylinder 24 is driven through two air lines 28 and 30, which are supplied through a rotating joint, shown in more detail on FIG. 3.

Figure 3:
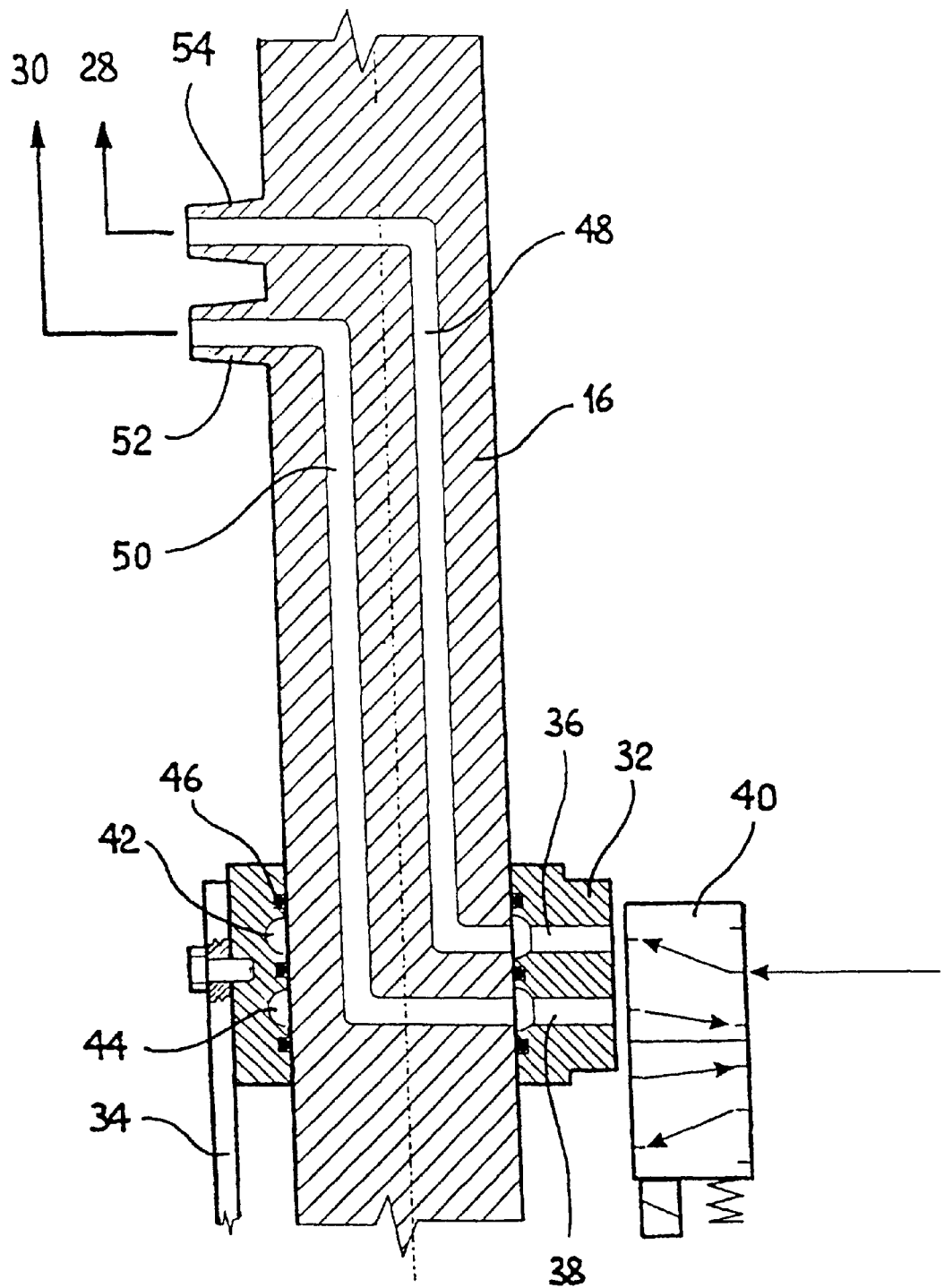
FIG. 3 is a enlarged view in axial cross-section of a detail of the apparatus of FIG. 1.

With reference to FIG. 3, the rotating joint comprises a sleeve 32 surrounding shaft 16 and kept in position by a bracket 34. Sleeve 32 has two connectors 36, 38, which can be supplied alternatively with compressed air from a system not shown through an electrovalve 40. The connectors open to respective internal peripheral grooves 42, 44, provided with adjacent sealing gaskets 46. Grooves 42, 44 communicate with respective ducts 48, 50, which are machined within shaft 16 and terminate at respective fittings 52, 54, with which air lines 28 and 30 are connected.

With further reference to FIG. 1 and 2, the apparatus according to the invention also comprises a loaf distributor 56, a pizza moulder 58, several dressing distributors 60 (only one being shown in FIG. 1 for simplicity), and finally a baking oven 62, all of which are arranged around central shaft 16, at substantially similar radial distances, as will be explained below in more detail. A circular raceway 64, coaxial with shaft 16, is placed beneath the delivery outlets of devices 56 to 60, to act as a collector for any material that might drop from shovel 22, as better disclosed below.

Figure 4:
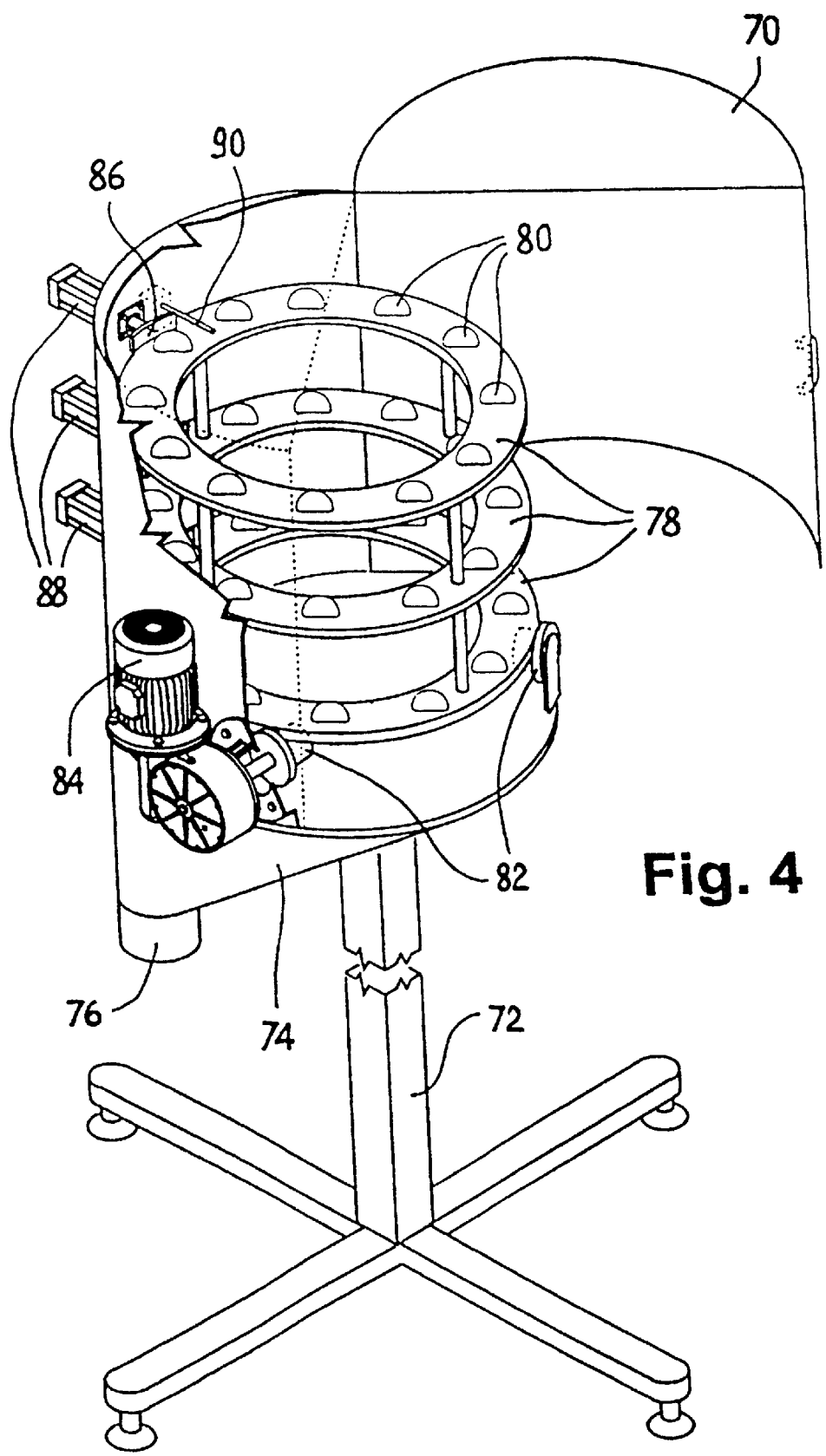
FIG. 4 is a perspective view, partly broken away, on an enlarged scale, of a loaf distributor belonging to the apparatus of FIG. 1.

Turning now to FIG. 4, the loaf distributor 56 comprises a cylindrical casing 70, which is supported on a pedestal 72 and which terminates below with a funnel 74 having a vertical delivery outlet 76 opening downwards at a small distance from the level of shovel 22. Within casing 70, a magazine of dough loaves comprises a frame having three annular shelves 78, which are intended for storing a number of globular dough loaves such as 80 and are rotatably supported on three rubber-coated rollers 82, one of which is driven by a motor 84 with reduction gear. At each shelf 78 a respective pusher paddle such as 86 is arranged, which can be driven by a respective hydraulic cylinder 88 for radially sweeping across the associated shelf and pushing a dough loaf 80 toward the shelf axis, and consequently dropping the loaf into inclined funnel 74 and toward outlet 76. Near paddle 86, a proximity sensor 90 is preferably arranged, which will detect the presence or absence of a loaf and will either enable the operation of the associated paddle, if a loaf is present, or step shelves 78 forward, if a loaf is absent, according to a program that is implemented in control circuits not shown, because they are obvious for a person skilled in the field and are outside the scope of the invention.

In operation, motor 12 steps shaft 16 around, together with shovel 22. The shovel stops beneath outlet 76, and, at the same time, one of actuator cylinders 88 to drop a loaf into funnel 74 and from there on the shovel.

Turning now to FIG. 5, pizza moulder 58 of FIG. 1 comprises a post 92 on which a vertical rod 94, driven by an air cylinder 96, is slidably supported. Rod 94 has a horizontal spreader disk 98 at its lower end, the disk having a flat lower surface, preferably provided with a peripheral groove 100. Rod 94 is also bored axially, so that a duct 102 is formed from a fitting 104 to the center of spreader disk 98, for connection of a source of compressed air to perform an ejector function, as further explained below.

Moreover, the upper end of rod 94 is integral with a transverse arm 106, having one end guided in a slot 108 having an upper, vertical leg joining a lower, inclined leg, so that, as rod 94 is lowered, it is also rotated around its vertical axis.

Above spreader disk 98, a restraining cup 110 is also arranged slidably on rod 94. Cup 110 has a rim surrounding disk 98 and is biased toward the disk by a wound compression spring 114.

When shovel 22, carrying a globular loaf received from loaf distributor 56, stops beneath spreader 58, the air cylinder is operated to push disk 98 downwardly against the loaf, the latter being squeezed between the disk and the shovel. Cup 110 also follows the disk, and its rim 112 is stopped by abutment against shovel 22, thus acting as a restraining enclosure for the dough of the loaf and giving each pizza a uniform size. Peripheral groove 100 in the spreader disk allows a thick peripheral bead to grow in the pizza. The rotation of the disk around its axis, caused by engagement of arm 106 in slot 108, helps the dough to spread smoothly.

With reference to FIGS. 1 and 6, a dressing distributor will now be described by way of example. The dressing distributor comprises a vessel 116, supported on a bracket 117, and having a flat bottom with two symmetrically eccentric apertures 118. An axial shaft 120 supports a stirring paddle 122 within the vessel and a thick metering disk 124 having two symmetrically eccentric apertures 126 which can be aligned with apertures 118. Metering disk 124 is retained against the vessel bottom by a strap 128 made as a diametrically arranged plate, having a width equal or larger than the diameter of apertures 126, and attached to the vessel with screws 128. Metering disk 124 is engaged by an arm 130, driven by an actuator 132.

When at rest, metering disk 124 of dressing distributor 60 is maintained by arm 130 in a position where its apertures 126 are aligned with apertures 118 in the bottom of vessel 116, and therefore closed by strap 128. The dressing contained in the vessel (such as hashed mozzarella, tomato, or other minced o creamy food) flow down to fill apertures 124, but are stopped by closure strap 128. When shovel 22 has been stepped forward to a point beneath dressing distributor 60 and actuator 132 is operated, arm 130 turns metering disk 124 by an angle, such as 45°, apertures 126 are freed from strap 128 and discharge their contents on the underlying pizza, while the upper surface of the disk stops apertures 118 in the vessel bottom. A portion of dressing is therefore delivered that is equal to the overall volume of both apertures. Preferably, arm 130, after it has moved back to its rest position, performs a similar rotation in the opposite direction, again discharging portions of dressing, so that the dressing is distributed with a reasonable degree of uniformity on the underlying pizza. At each rotation, stirring paddle 122 stirs the contents of the vessel.

The dressing distributor described above can be easily adapted to different kinds and quantities of minced dressings, by changing the gauge of apertures 126 and the thickness of disk 124. Although only one dressing distributor 60 is shown on FIG. 1 for clarity and simplicity, the apparatus of the invention, as shown on FIG. 2, comprises a number of distributors, seven in the embodiment shown, all arranged at preferably equal distances from the central shaft.

With further reference to FIG. 1, oven 62 comprises a table 134 covered by a housing 136, having passages 138, 140 on the front and the back, and internally provided with known heater means (not shown), e.g. electric resistance means. The inner room of the oven can house, for instance, two pizzas at a time, as shown in 142. Within housing 136, two curved paddles 144, 146 are also provided, which can be turned by actuator means such as 148, to rotate the paddles around axes 150, 152, respectively.

In operation, as explained above, shaft 16 rotates by steps, stopping shovel 22 first beneath loaf distributor 56, then beneath moulder 58, then, in sequence, under the dressing distributors 60. At each stop, the associated device performs its appointed task, so that, finally, shovel 22 will carry a spread pizza, sprinkled with the desired dressings.

Preferably, rotation of shovel 22 and the operation of the several devices take place under control of an electronic control system not shown, as obvious for a person skilled in the art, preferably including a keypad for selection of various parameters such as kinds and quantities of dressing, possibly under direct command of the consumer.

When shovel 22, after moving through the entire path, stops in front of oven 62, air cylinder 24 is operated (also under program control) to move slide 20 forward at a first speed and insert shovel 22 into passage 140 leading into the oven, at one of both pizza positions shown. The cylinder is then operated in the opposite direction, at a second, high speed, so that shovel 22 will withdraw sharply from the oven, thus unloading the pizza by inertia. While shovel 22 starts a fresh operating cycle, the pizza left in the oven will be baked. At the end of a predetermined time, as set in the program, actuator 148 (or the other similar actuator not shown) is operated, in order to turn paddle 144 or 146 and to push the pizza out of the oven, where the waiting customer can pick it up.

Figure 7:
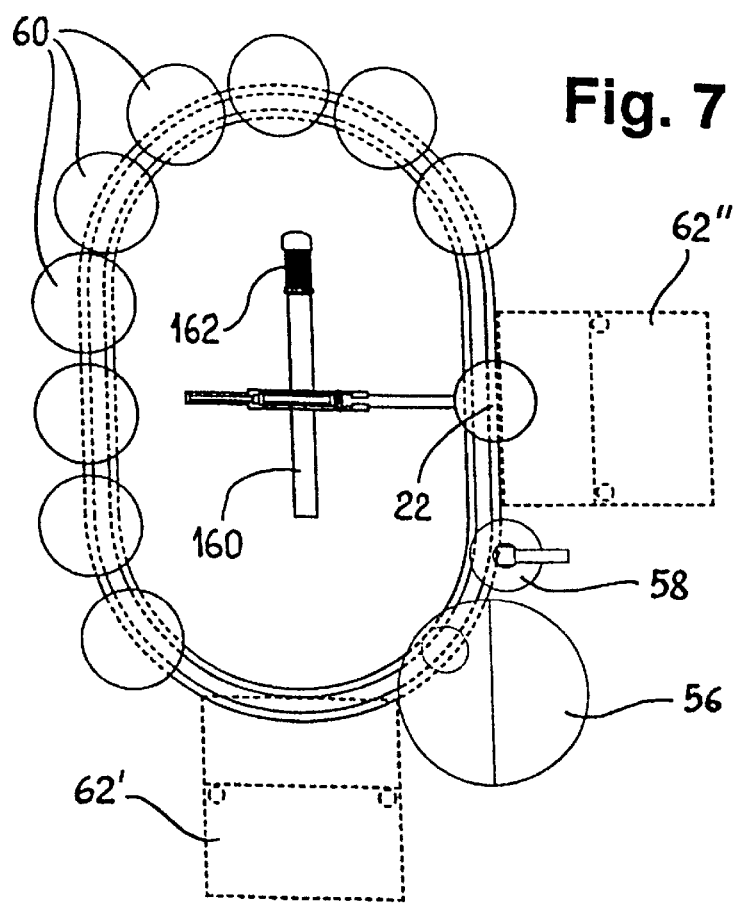
FIG. 7 is a diagrammatical, plan view of a modification of the apparatus of FIG. 1.

FIG. 7 shows a modification of the preferred embodiment of the apparatus according to the invention, which is similar to the embodiment of FIGS. 1 and 2, and which differs from it essentially in that shovel 22 follows an oval, rather than a circular path, due to a translating mechanism 160 for support shaft 16, driven by a motor 162. In this embodiment, the apparatus can be provided with a larger number of dressing distributors 60, for a wider range of the kinds of pizza. Moreover, the apparatus can be provided with two ovens 62', 62", for a higher production rate.

Figure 8:
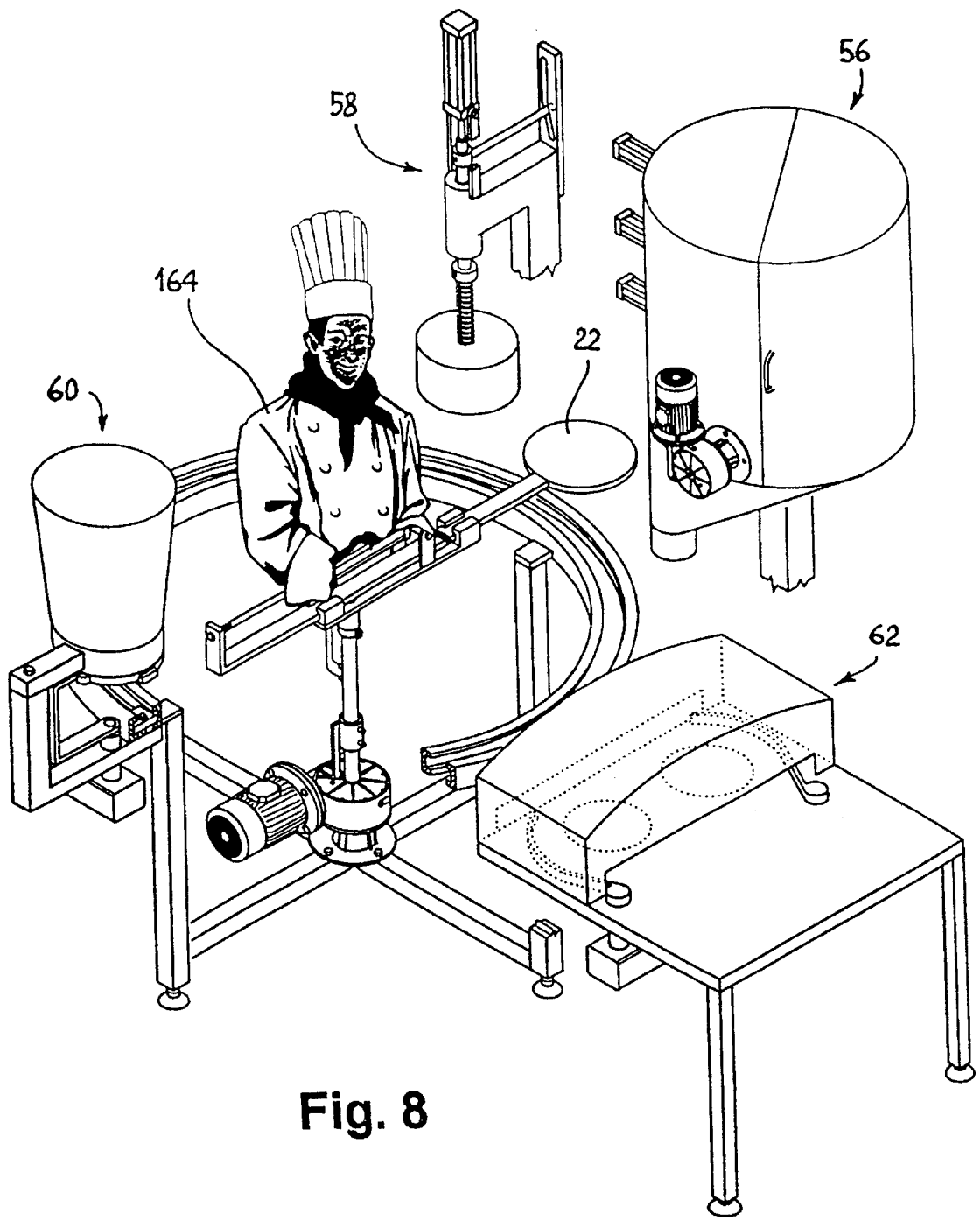
FIG. 8 is a view, similar to FIG. 1, showing a version of the apparatus according to the invention.

FIG. 8 shows a particular embodiment of the apparatus according to the invention, which is identical to the embodiment of FIG. 1 in its mechanical structure, but is provided with a tridimensional puppet 164, representing a cook, integral with bracket 18. The embodiment including a puppet contributes to make the apparatus mo9re agreeable to the public, also in consideration of the fact that the puppet turns around in step with the shovel, giving the illusion that the puppet's arm actually pushes and withdraws the shovel in and out of the oven.

It is evident that the preferred embodiments of the apparatus as described and shown in the Figures above are liable to numerous other variations, by means of alternative but equivalent mechanical solutions. Merely by way of example, the rotation of the shaft carrying shovel 22 might be obtained by a stepping motor instead of a motor with reduction gear; the distributor of dough loaves 56 might be a metering device operating on bulk dough; the spreading member 58 might be provided with one or more spreading rolls; and the dressing distributors 60 might be at least partially replaced with other kinds of known distributors or metering devices, depending on the kind of dressing. These and other modifications, which may be known or obvious for the person skilled in the art, are to be regarded as falling within the scope of the invention.

What is claimed is:

1. Apparatus for the mechanized preparation of pizzas, comprising a pizza-carrying tray which is drivable step by step through a predetermined path by motorized means, so that it cooperates successively with a distributor of dough loaves arranged for dropping loaves on the tray, a pizza moulder for pressing and spreading the loaf, a distributor of a dressing for dropping metered portions of dressing on the pizza carried by the shovel, and an oven, wherein the pizza-carrying tray is a horizontal shovel supported on a slide which is movable transversely to the path of the shovel driving means, so that it can be extended to project into the oven to deliver the pizza and withdraw from the oven.

2. Apparatus for the mechanized preparation of pizzas according to claim 1, wherein said slide is movable at different speeds in one and the other direction of motion, so that the shovel, when it is dwelling before the oven, is operable to enter the oven slowly while carrying a pizza, and to quickly withdraw from the oven in order to unload the pizza.

3. Apparatus for the mechanized preparation of pizzas according to claim 1, further comprising a number of distributors arranged at further stops in the shovel path.

4. Apparatus for the mechanized preparation of pizzas according to claim 1, wherein the shovel driving means comprise a vertical shaft which is driven by an electric motor.

5. Apparatus for the mechanized preparation of pizzas according to claim 1, wherein the distributor of dough loaves comprises at least one loaf resting shelf and at least one pushing member for dropping a loaf from the shelf onto a delivery chute that is alignable with the shovel.

6. Apparatus for the mechanized preparation of pizzas according to claim 1, wherein the pizza moulder comprises a disk carried by an actuator for pushing the disk vertically toward the shovel in order to spread the loaf on the shovel.

7. Apparatus for the mechanized preparation of pizzas according to claim 6, wherein a cup is arranged coaxially with the disk and has a rim surrounding the disk for defining the boundary of the pizza while it is spread.

8. Apparatus for the mechanized preparation of pizzas according to claim 6, wherein the disk actuator imparts the disk a rotation around its axis during the descent.

9. Apparatus for the mechanized preparation of pizzas according to claim 6, wherein a port for compressed air opens in the center of the disk, for separating the flattened pizza from the spreader disk.

10. Apparatus for the mechanized preparation of pizzas according to claim 1, wherein at least one of the distributors of dressing comprises a vessel with a flat bottom and at least one eccentric opening, and a rotatable disk placed under the vessel bottom and having an aperture which is alignable with the opening in the vessel bottom by rotation.

11. Apparatus for the mechanized preparation of pizzas according to claim 1, wherein the oven comprises at least one pusher paddle which is operable to deliver the pizza out of the oven at the end of baking.

12. Apparatus for the mechanized preparation of pizzas according to claim 11, wherein the pusher paddle is curved and is rotatable around one of its ends by the action of an actuator.

* * * * *

UNITED STATES PATENT AND TRADEMARK OFFICE
CERTIFICATE OF CORRECTION

PATENT NO.   : 6,363,838 B1  
DATED        : April 2, 2002  
INVENTOR(S)  : Stefano Tomatis It is certified that error appears in the above-identified patent and that said Letters Patent is hereby corrected as shown below:

<u>Title page,</u>  
Item [73], should read as follows: -- [73]  Assignee: C.M.T. Costruzioni Meccaniche e Tecnologia S.p.A., Peveragno (IT) --

Signed and Sealed this

Third Day of September, 2002

*Attest:*

*Attesting Officer*

JAMES E. ROGAN  
*Director of the United States Patent and Trademark Office*